(12) United States Patent
Moffatt et al.

(10) Patent No.: US 12,337,860 B2
(45) Date of Patent: Jun. 24, 2025

(54) VEHICLE CONFIGURATION FOR INTEGRATION OF AN ACCESSORY

(71) Applicant: Ford Global Technologies, LLC, Dearborn, MI (US)

(72) Inventors: Benjamin Moffatt, Iver (GB); Ian Salsbury, Wickford (GB); Yasmin Jawad, Dearborn, MI (US); Christopher Harrison, Hornchurch (GB); Jake Larsson, London (GB); Bahareh Saboktakin Rizi, London (GB); Joseph Hornby, London (GB); Cheok Man Chu, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 17/948,031

(22) Filed: Sep. 19, 2022

(65) Prior Publication Data
US 2024/0092380 A1    Mar. 21, 2024

(51) Int. Cl.
*B60W 50/14*  (2020.01)
*G06F 3/04847*  (2022.01)

(52) U.S. Cl.
CPC ......... *B60W 50/14* (2013.01); *G06F 3/04847* (2013.01); *B60W 2050/146* (2013.01)

(58) Field of Classification Search
CPC ............. B60W 50/14; B60W 2050/146; G06F 3/04847
See application file for complete search history.

(56) References Cited

U.S. PATENT DOCUMENTS

| | | | |
|---|---|---|---|
| 11,768,975 B1* | 9/2023 | Wang | G06F 30/31 703/8 |
| 2013/0162421 A1* | 6/2013 | Inaguma | H04B 5/72 340/438 |
| 2014/0088793 A1 | 3/2014 | Morgan et al. | |
| 2018/0339662 A1 | 11/2018 | Wincek et al. | |
| 2019/0049262 A1* | 2/2019 | Grimm | G01C 21/3492 |
| 2019/0118653 A1* | 4/2019 | Betz | B60K 35/10 |
| 2019/0202380 A1* | 7/2019 | Schumacher | B60Q 9/00 |
| 2020/0216087 A1* | 7/2020 | Kim | B60K 35/81 |
| 2020/0231168 A1* | 7/2020 | Uthaicharoenpong | H04W 4/40 |
| 2020/0369148 A1* | 11/2020 | Bongard | G06F 3/04886 |
| 2022/0036758 A1* | 2/2022 | Oh | G06T 19/006 |
| 2023/0059562 A1* | 2/2023 | Chan | G06F 30/20 |
| 2023/0324184 A1* | 10/2023 | Wang | H04W 4/40 701/533 |

* cited by examiner

*Primary Examiner* — Naeem Taslim Alam
(74) *Attorney, Agent, or Firm* — Haley Guiliano LLP

(57) ABSTRACT

The disclosure relates to simplifying the integration of a peripheral with a vehicle. The complexity of modern vehicle electronics means that integration of a peripheral with a vehicle requires a reconfiguration of the vehicle electronics in order for the resultant upfitted vehicle to function as desired by the user. This restricts the set of users and enterprises which are able to successfully integrate a new peripheral with a vehicle. To make the task more approachable, a software application is described which presents a user with a graphical user interface enabling them to specify, at a high-level, rules of behavior for the upfitted vehicle. From the user's inputs via the graphical user interface, the application creates configuration data to be applied to the vehicle electronics in order to produce the desired behavior in the upfitted vehicle.

16 Claims, 16 Drawing Sheets

VEHICLE CONFIGURATION FOR INTEGRATION OF AN ACCESSORY

FIELD

The present disclosure concerns a method of configuring a vehicle to integrate an accessory and an accessory interface unit for integrating one or more accessories with a vehicle. The method and system have particular utility in relation to upfitting general purpose vehicles to provide a special purpose vehicle. The accessory may, in particular, be a peripheral added to an existing vehicle.

BACKGROUND

There are many special purpose vehicles which are provided by upfitting accessories to a more general-purpose vehicles. Examples include ambulances, cherry pickers, camper vans, dump trucks, taxis, police vehicles etc. More generally, there is a desire to allow vehicle buyers to customize their vehicle without having to perform highly technical and specialized hardware and firmware modification—an activity which can in many cases invalidate a warranty offer on sale of the vehicle.

SUMMARY OF INVENTION

According to a first aspect, there is provided a method of configuring a vehicle to integrate an accessory comprising:
generating for display a graphical user interface allowing the user to specify one or more high-level accessory-related rules relating to the operation of a vehicle equipped with the accessory;
receiving user-specified high-level accessory-related rules entered by the user via the graphical user interface;
translating the rules into a lower-level representation readable by an accessory interface unit adapted for communication with sensors or actuators associated with the vehicle accessory;
providing the lower-level representation to the accessory interface unit;
whereby the accessory interface unit cooperates with the sensors or actuators associated with the vehicle accessory to operate the vehicle accessory in accordance with the high-level accessory-related rules.

By providing a user with a high-level interface enabling the specification of accessory-related rules relating to the operation of a vehicle equipped with the accessory, and then translating the high-level accessory-related rules to a lower-level representation, and providing the lower-level representation to an accessory interface unit in communication with sensors or actuators associated with the vehicle accessory, more user-friendly vehicle configuration to accommodate an accessory is provided.

In some cases, the method further comprises translating the accessory-related rules to a low-level driver console configuration file for specifying the appearance of one or more GUI elements on the console providing an operator of the vehicle with one or both of control of the vehicle accessory and visibility of the status of the vehicle accessory.

In this way, control of the accessory can be provided to a driver without the need to install additional mechanical switches, dials or other mechanical controls in the vehicle, and connect them to the vehicle's existing electrical systems.

In some cases, the method further comprises storing the high-level accessory-related rules in persistent storage accessible to users tasked with configuring other vehicles with the accessory. Data stored in persistent storage may be stored as one or more files, using a database management system or in other forms.

In this way, re-use of a set of one or more high-level accessory-related rules is enabled. This can be particularly beneficial for fleet managers who might have to fit a large number of vehicles with the same accessory.

In some cases, the method further comprises generating for display a graphical user interface enabling the modification of a stored high-level accessory-related rule.

In this way, re-use of some of an existing high-level accessory-related rule, or some of a set of existing high-level accessory-related rules is enabled.

In some instances, providing the lower-level representation to the accessory interface unit involves transmitting the lower-level representation over an external communication network to the vehicle. The external communication network might be a wired local network (e.g. via a USB link, an OBD connection, an Ethernet cable etc.), a wireless local network (e.g. a Bluetooth® connection, Zigbee connection or Wi-Fi connection etc.), or a wireless wide area network (e.g. a cellular network, IoT network such as LoRa, or a IEEE 802.16 'WiMAX' network).

In some cases, the high-level accessory-related rules are event-action rules which specify one or more actions to be performed on the detection of an event. Event-action rules include event-condition-action rules in accordance with which the one or more actions are only performed in reaction to the event if the condition is met. The condition in such an example can involve a parameter such as an environmental parameter, or an operating parameter of the vehicle or the accessory. The condition may specify a value or a range of values of the parameter which the value of the parameter must equal or fall within (or alternatively not equal or fall outside) in order for the action to be performed.

The one or more actions can comprise one or more actions which alter the state of the accessory (to give a particular example, the accessory might be a beacon light, and the action might be to switch it on, or the accessory might be a snow plow, and the action might be to lower it to the level of the roadway).

In some cases, the method further comprises generating a software model of the accessory-equipped vehicle and importing one or more high-level accessory-related rules to the software model to simulate the operation of a vehicle equipped with the accessory when operating in accordance with the accessory-related rules.

Simulating the operation of the accessory-equipped vehicle under the control of a test configuration in this way allows a configuration to be tested before actually loading the configuration into a vehicle equipped with the accessory.

According to a second aspect, there is provided a system comprising control circuitry configured to: Display a graphical user interface allowing the user to specify one or more high-level accessory-related rules relating to the operation of a vehicle equipped with the accessory; receive user-specified high-level accessory-related rules entered by the user via the graphical user interface; and translate the received user-specified high-level accessory-related rules into a lower-level accessory-related configuration.

In some cases, the system is an embedded system and further comprises:
a controller area network port connectable to a vehicle controller area network;

one or more accessory ports connectable to electrical systems of respective accessories; and the control circuitry is further configured to:

store the lower-level accessory-related configuration;

interpret the lower-level accessory-related configuration to generate a control signal on one of the ports in response to a sensor signal received on the accessory port, or to cause the generation of a control signal on the accessory port in response to a sensor signal received on one of the other ports.

In those cases, the user is able to interact with an embedded system in the vehicle in order to configure the operation of the vehicle with the accessory. In other cases, the user can create the high-level accessory-related rules on a computer, smartphone or other external processing platform, and then load the lower-level accessory-related configuration into an embedded system in the vehicle.

In some cases in which the system is an embedded system, the received sensor signal may be indicative of a driver input on an accessory control element displayed on the driver console.

In some cases in which the system is an embedded system, the output control signal controls the output of an accessory state display element on the driver console.

According to a third aspect, there is provided a computer-readable medium tangibly embodying instructions executable by a processor to:

Display a graphical user interface allowing the user to specify one or more high-level accessory-related rules relating to the operation of a vehicle equipped with the accessory;

receive user-specified high-level accessory-related rules entered by the user via the graphical user interface;

translate the user-specified rules into a lower-level accessory-related configuration readable by an accessory interface unit adapted for communication with sensors or actuators associated with the vehicle accessory;

provide the lower-level accessory-related configuration to the accessory interface unit;

whereby the accessory interface unit cooperates with the sensors or actuators associated with the vehicle accessory to operate the vehicle accessory in accordance with the high-level accessory-related rules.

For the avoidance of doubt, the skilled person will appreciate that, except where mutually exclusive, a feature described in relation to any one of the above aspects may be applied in the same way to any other aspect. Furthermore, except where mutually exclusive, any feature described herein may be applied to any aspect and/or combined with any other feature described herein.

FIGURES

Examples will now be described by way of example only, with reference to the Figures, in which.

Figure 3:
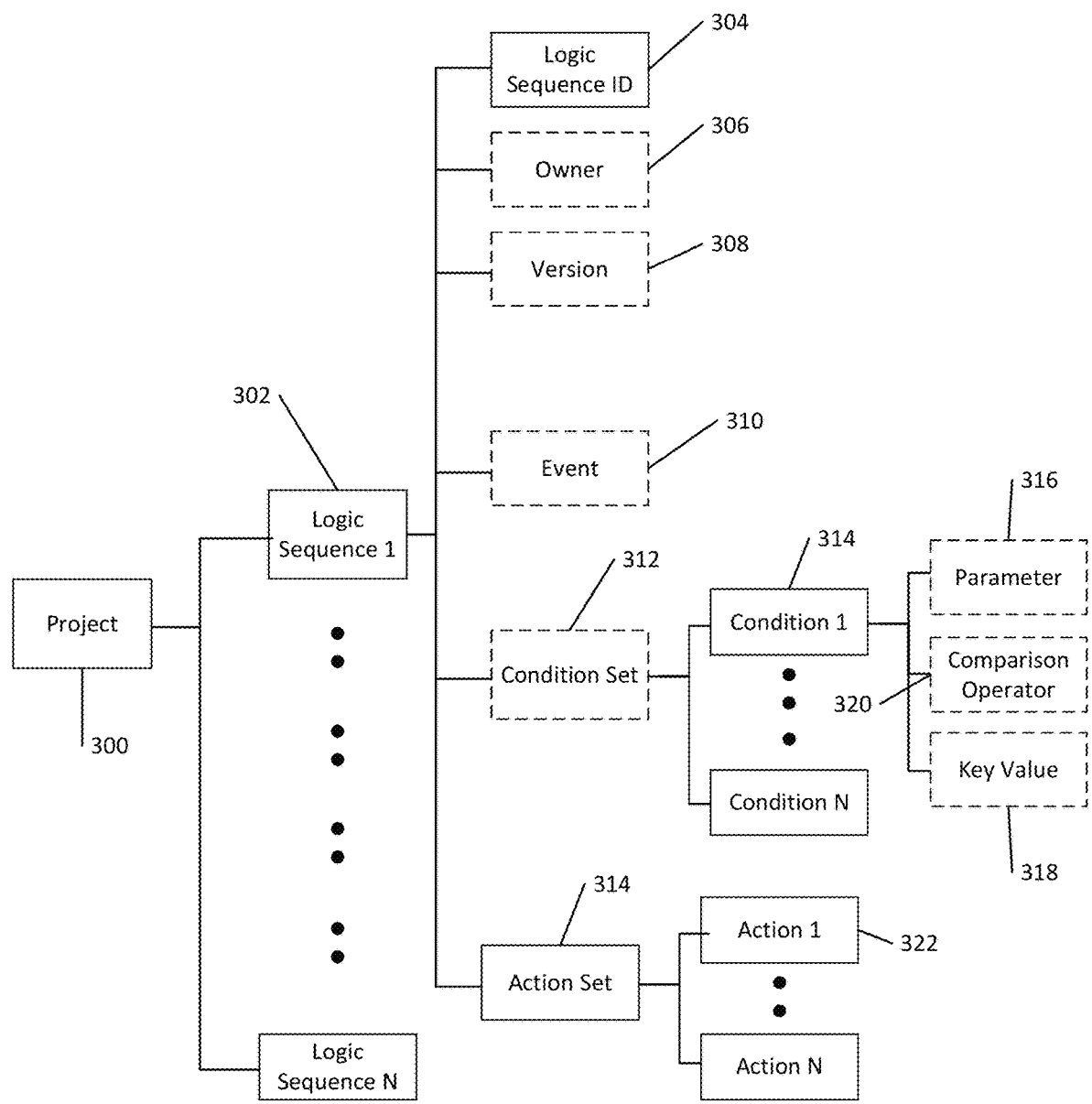
Figure 4:
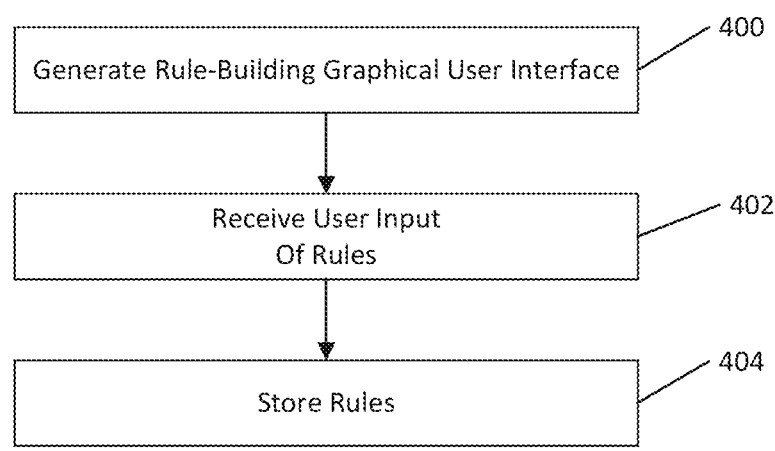
Figure 5:
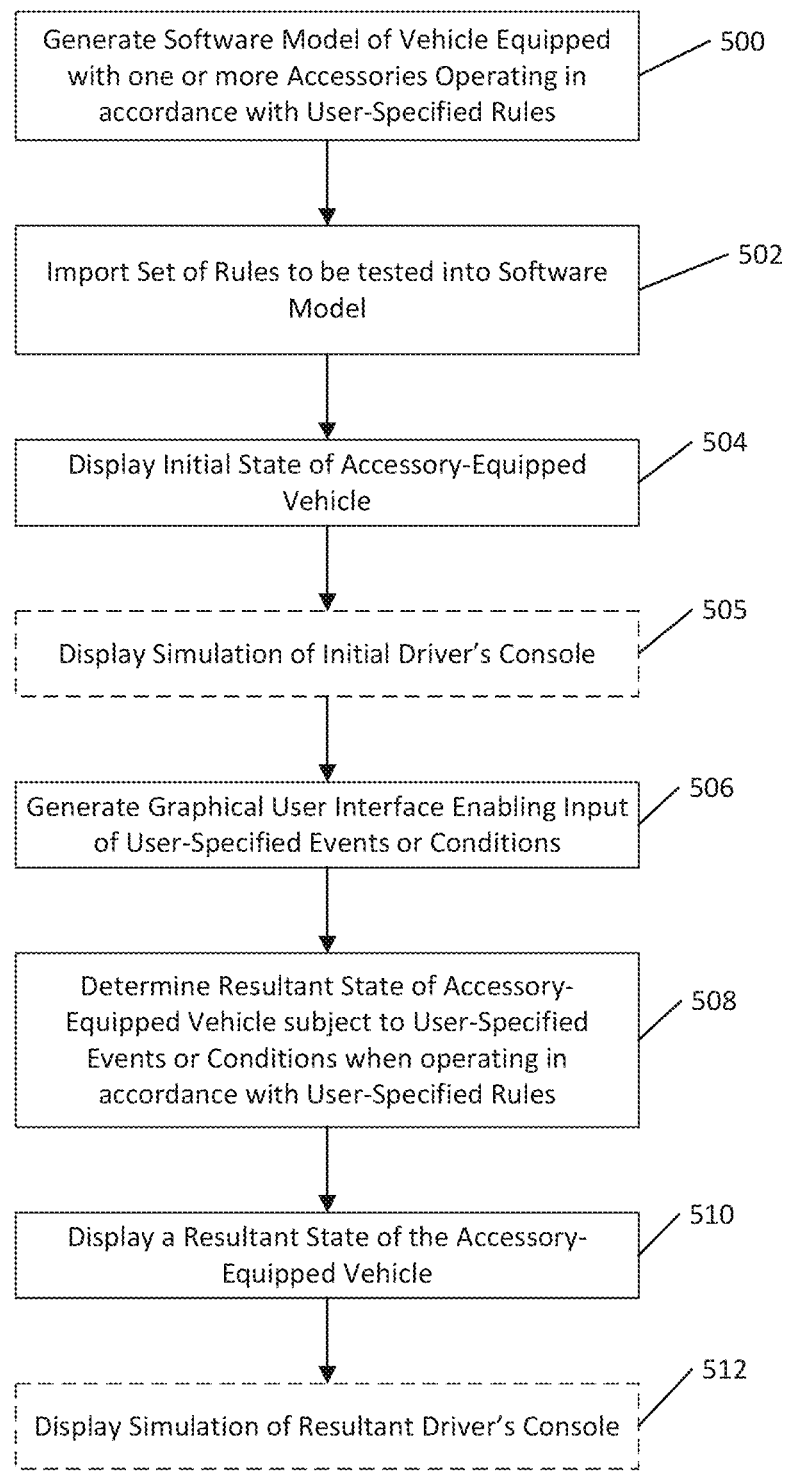
Figure 6:
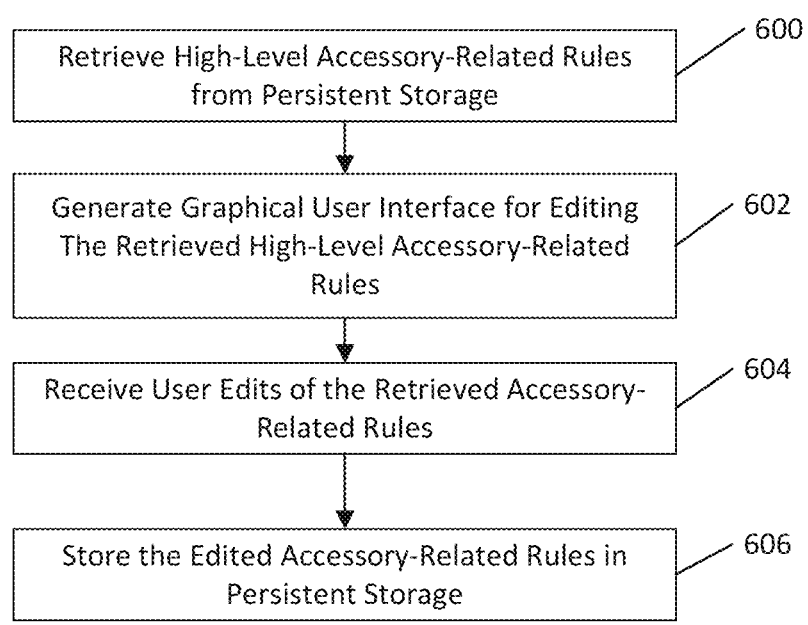
Figure 7:
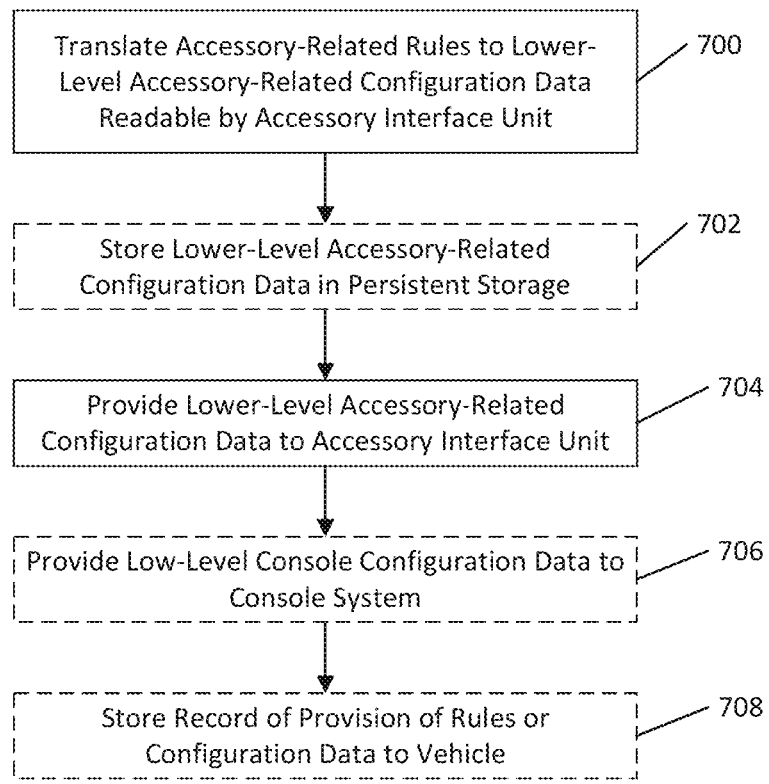
Figure 8:
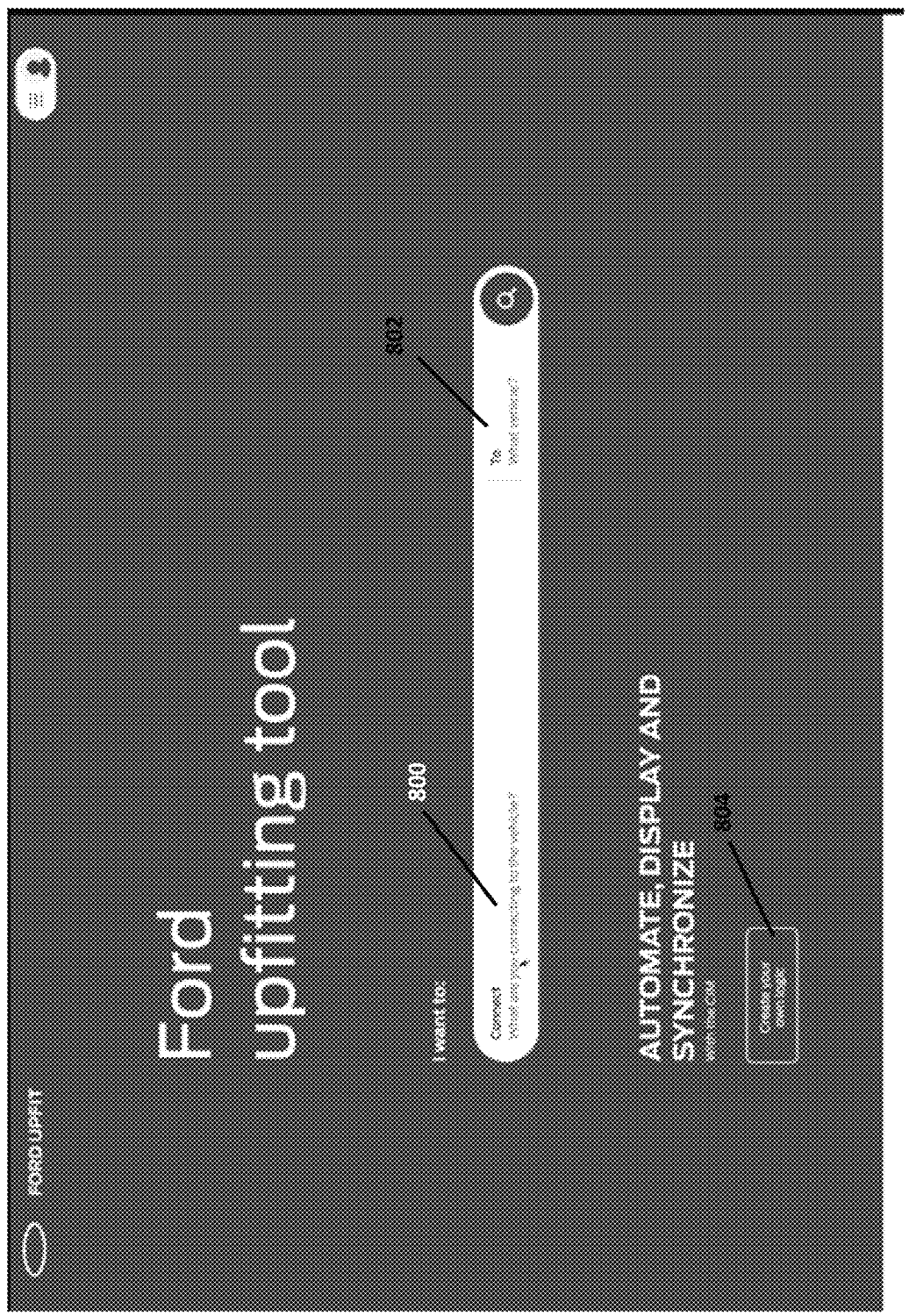
Figure 9:
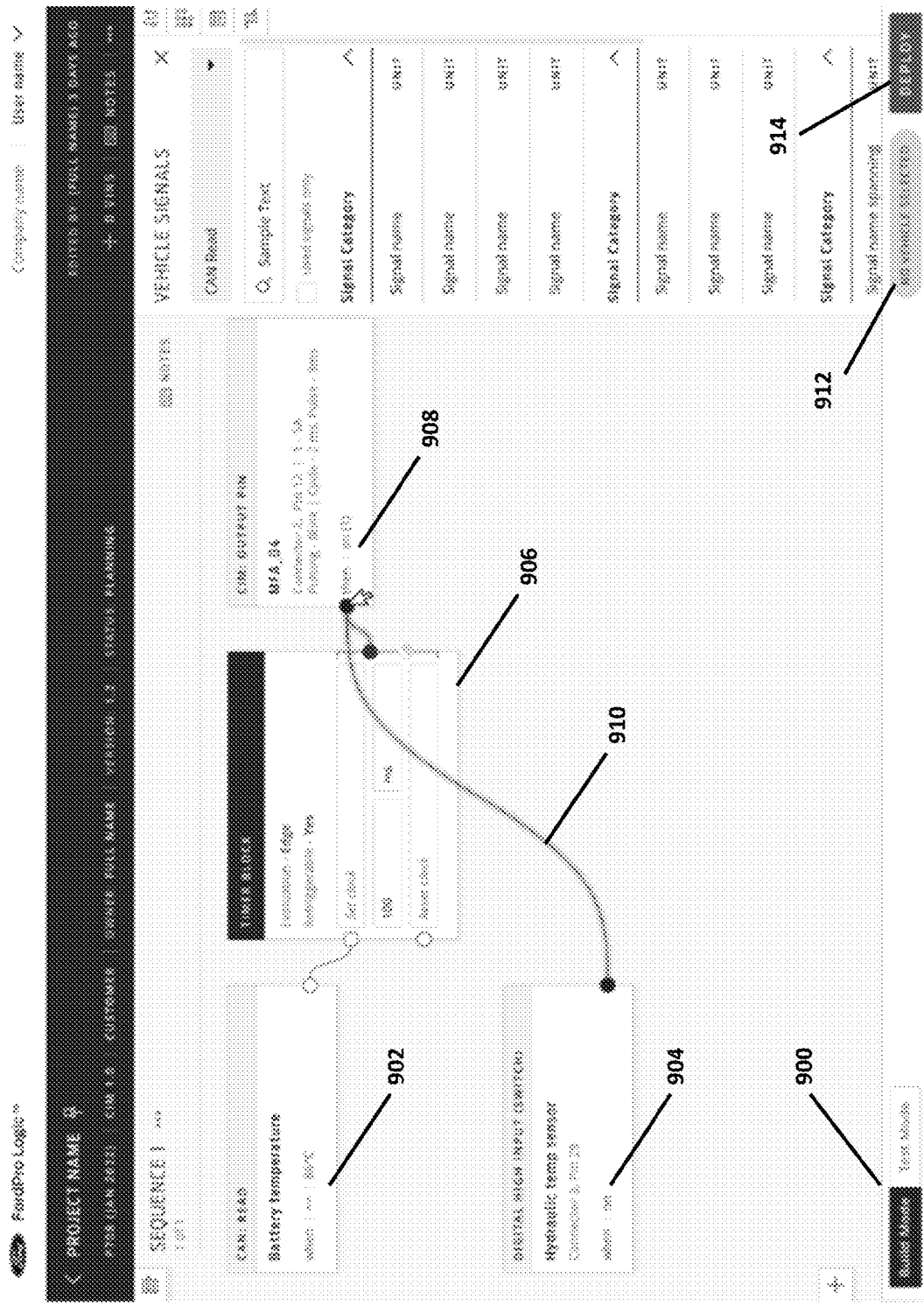
Figure 10:
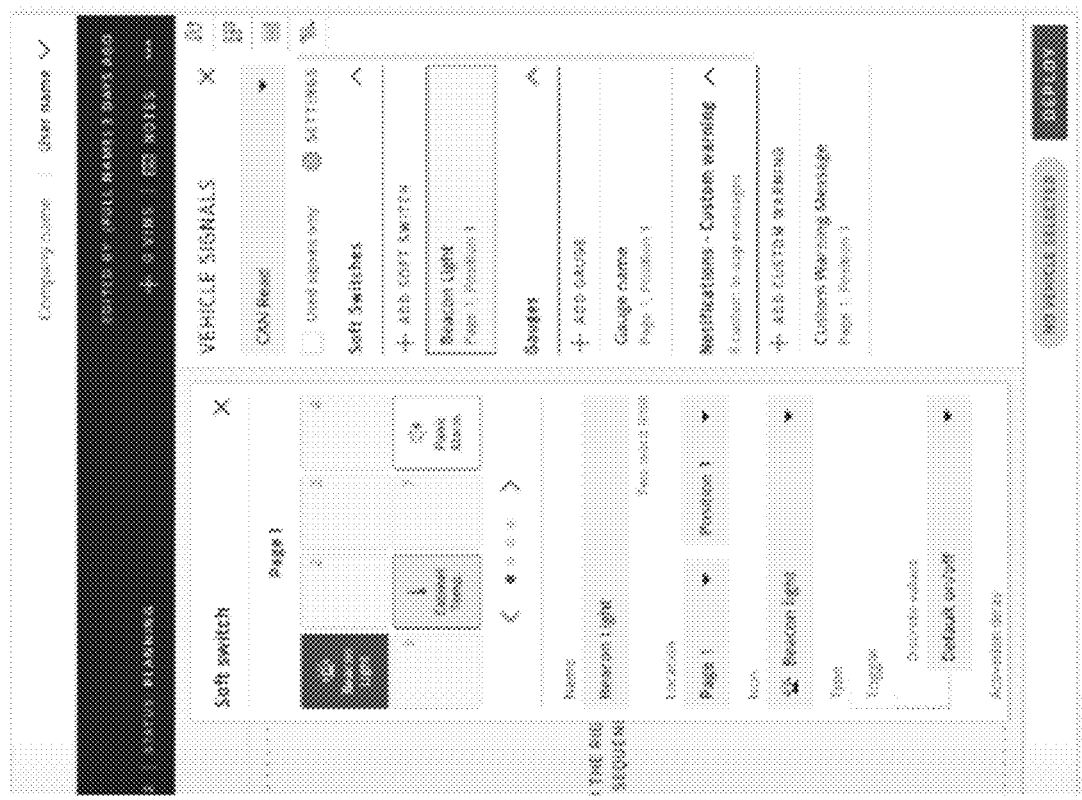
Figure 11:
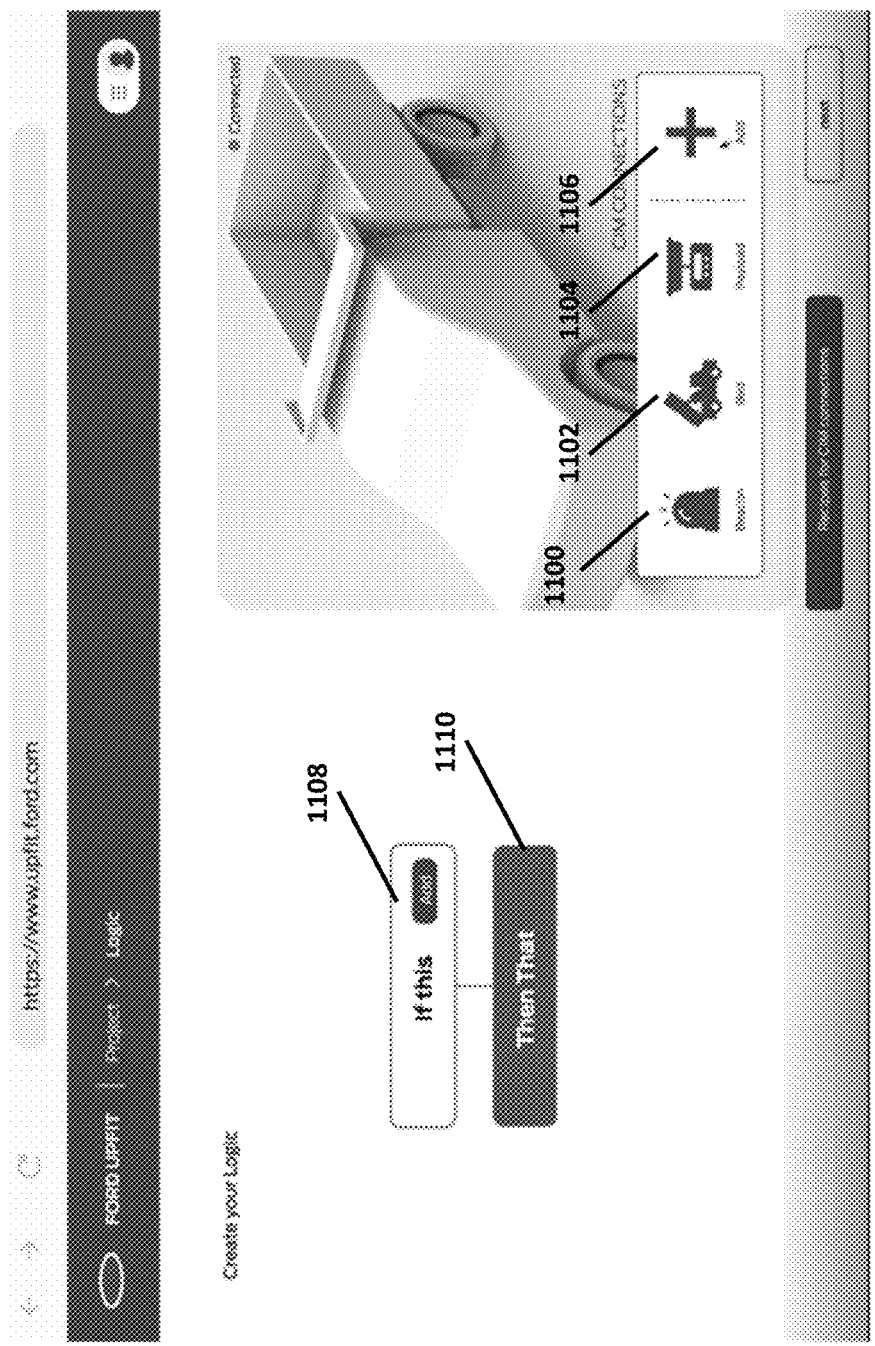
Figure 12:
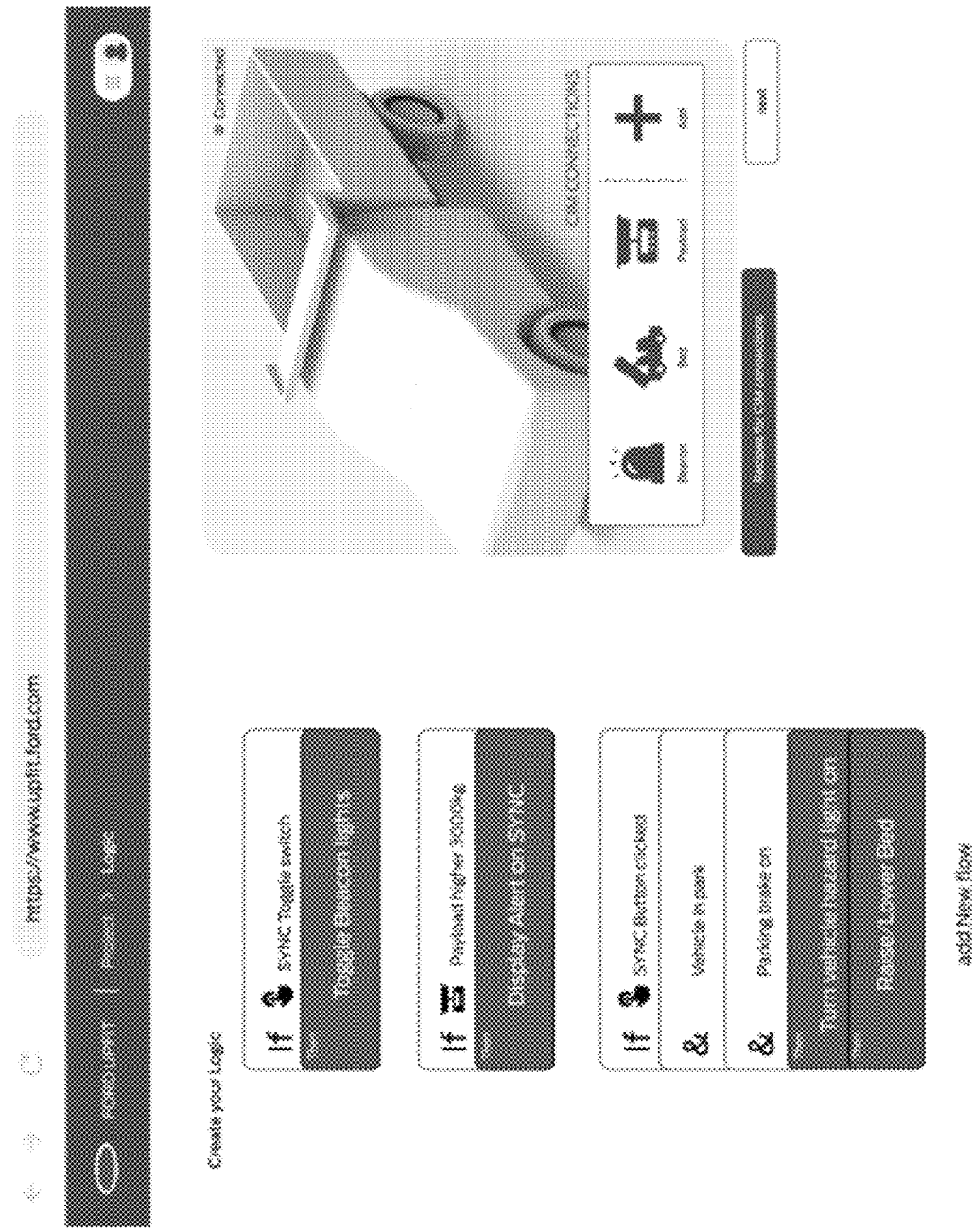

FIG. 3 schematically illustrates a data structure for a set of high-level accessory-related rules (the rules being rules of how other vehicle systems inter-operate with the accessory—note the other vehicle systems can include other accessories);

FIG. 4 is a flowchart illustrating a method of generating and storing a user-specified set of high-level accessory-related rules;

FIG. 5 is a flowchart illustrating a method of providing a test bed for an accessory-equipped vehicle operating in accordance with user-specified accessory-related rules;

FIG. 6 is a flowchart illustrating a method of editing stored accessory-related rules;

FIG. 7 is a flowchart illustrating the translation and deployment of high-level accessory-related rules;

FIG. 8 is a screenshot of a start page of an upfitting tool;

FIG. 9 is a screenshot of a graphical user interface enabling a user to specify high-level accessory-related rules;

FIG. 10 is a screenshot of a graphical user interface enabling a user to specify screen inputs and outputs to appear on the driver's console;

FIG. 11 is a screenshot of an alternative graphical user interface enabling a user to specify high-level accessory-related rules;

FIG. 12 is a screenshot of a graphical user interface showing a set of rules as specified by a user.

Figure 13:
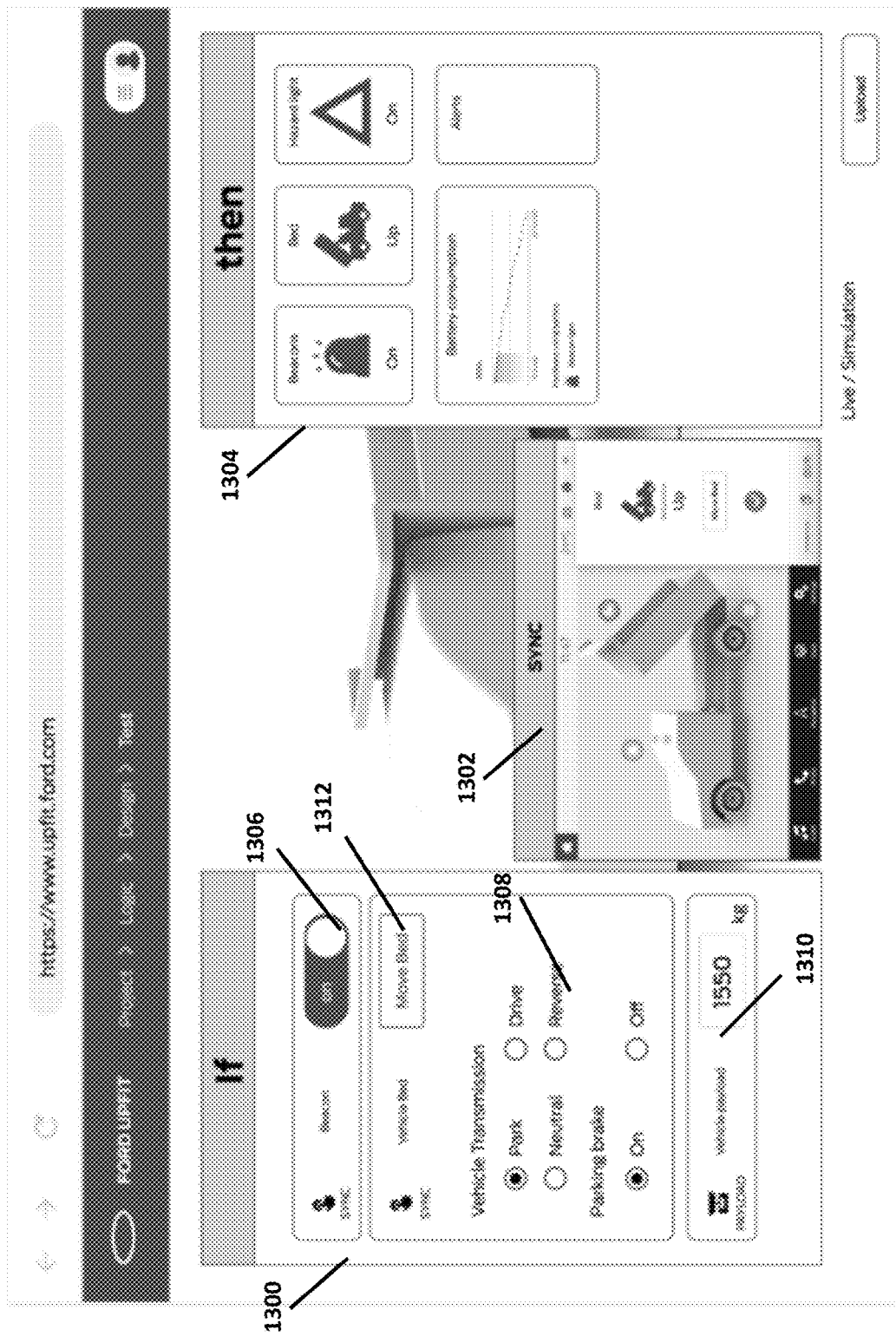
Figure 14:
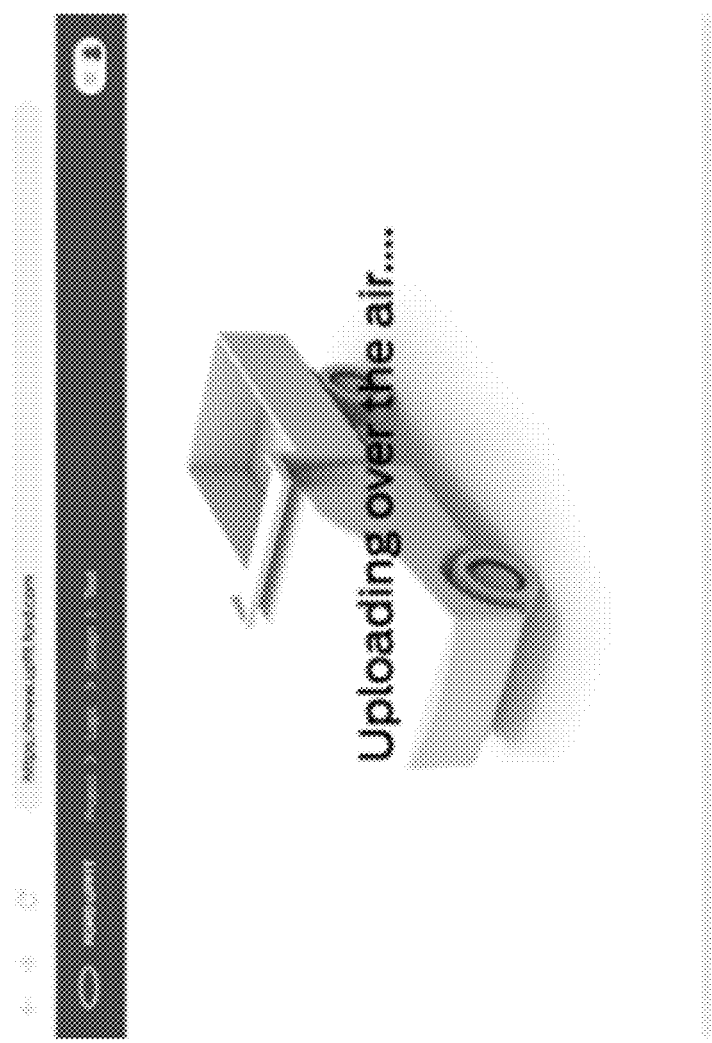
Figure 15:
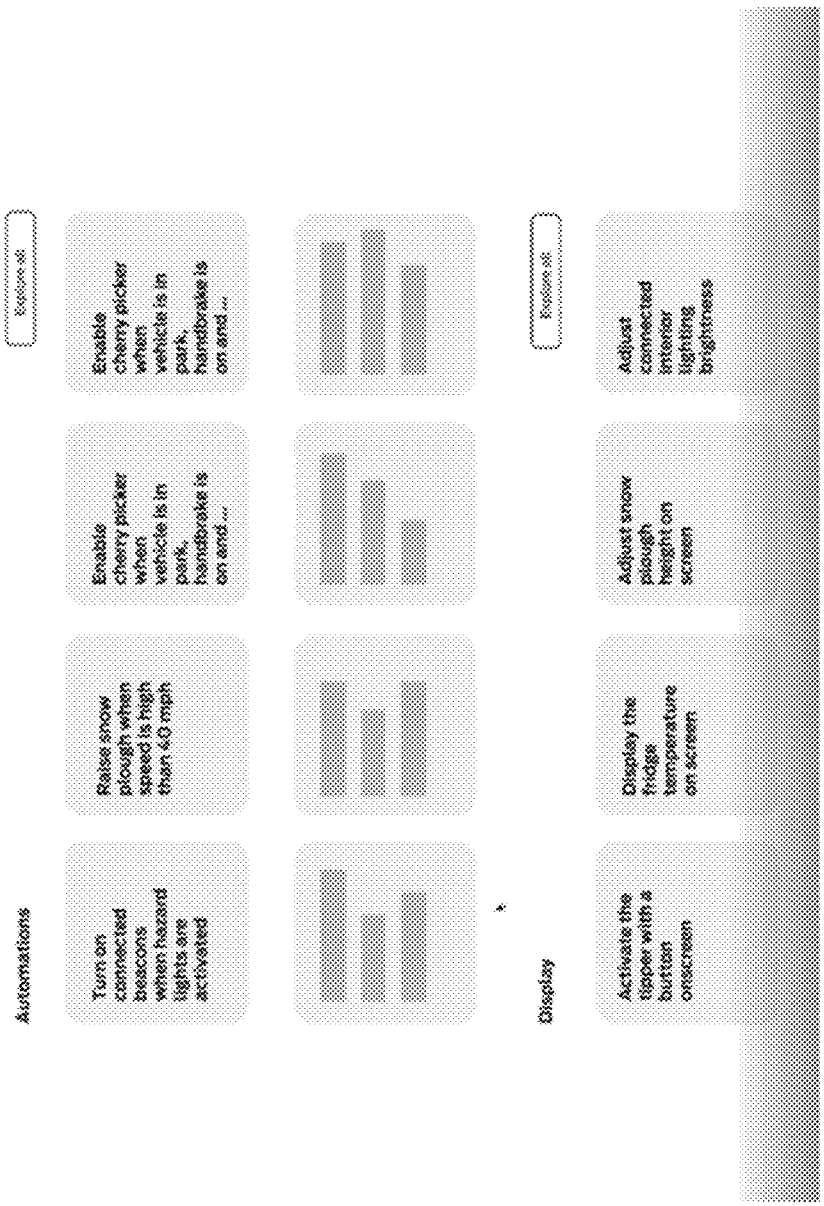
Figure 16:
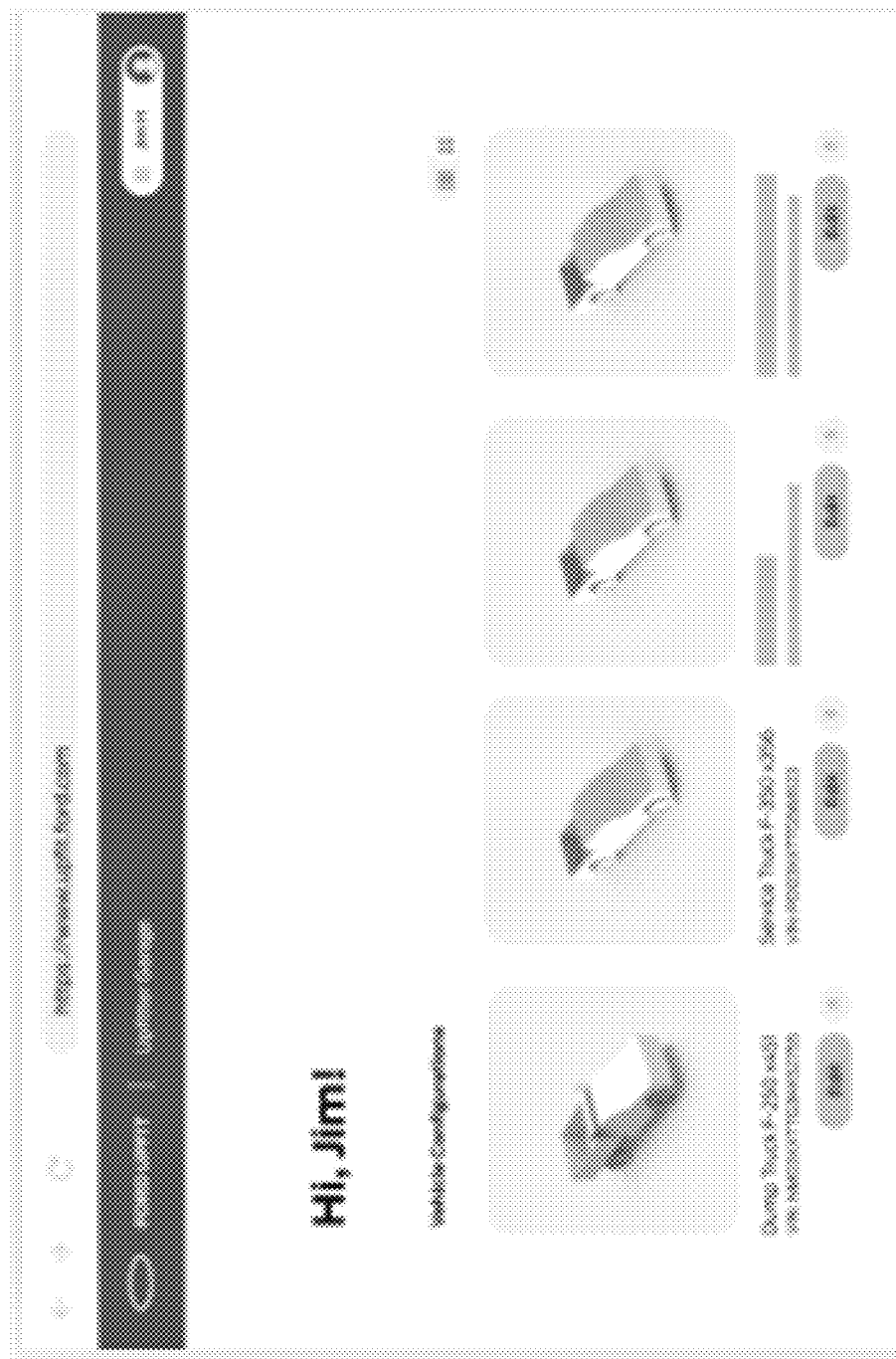

FIG. 13 is a screenshot of a graphical user interface allowing a user to test the operation of an accessory-equipped vehicle operating in accordance with user-specified rules;

FIG. 14 is a screenshot of lower-level configuration being sent over a wireless link to an accessory-equipped vehicle;

FIG. 15 is a screenshot of a library of sets of user-specified high-level configuration rules stored in persistent storage (note that could be closed user group, and an advantage of storing the high-level rules is that it provides something robust to changes in lower-level details; and FIG. 16 is a screenshot of a tool enabling a fleet manager to browse and update the configuration of vehicles in the fleet.

DETAILED DESCRIPTION

Figure 1:
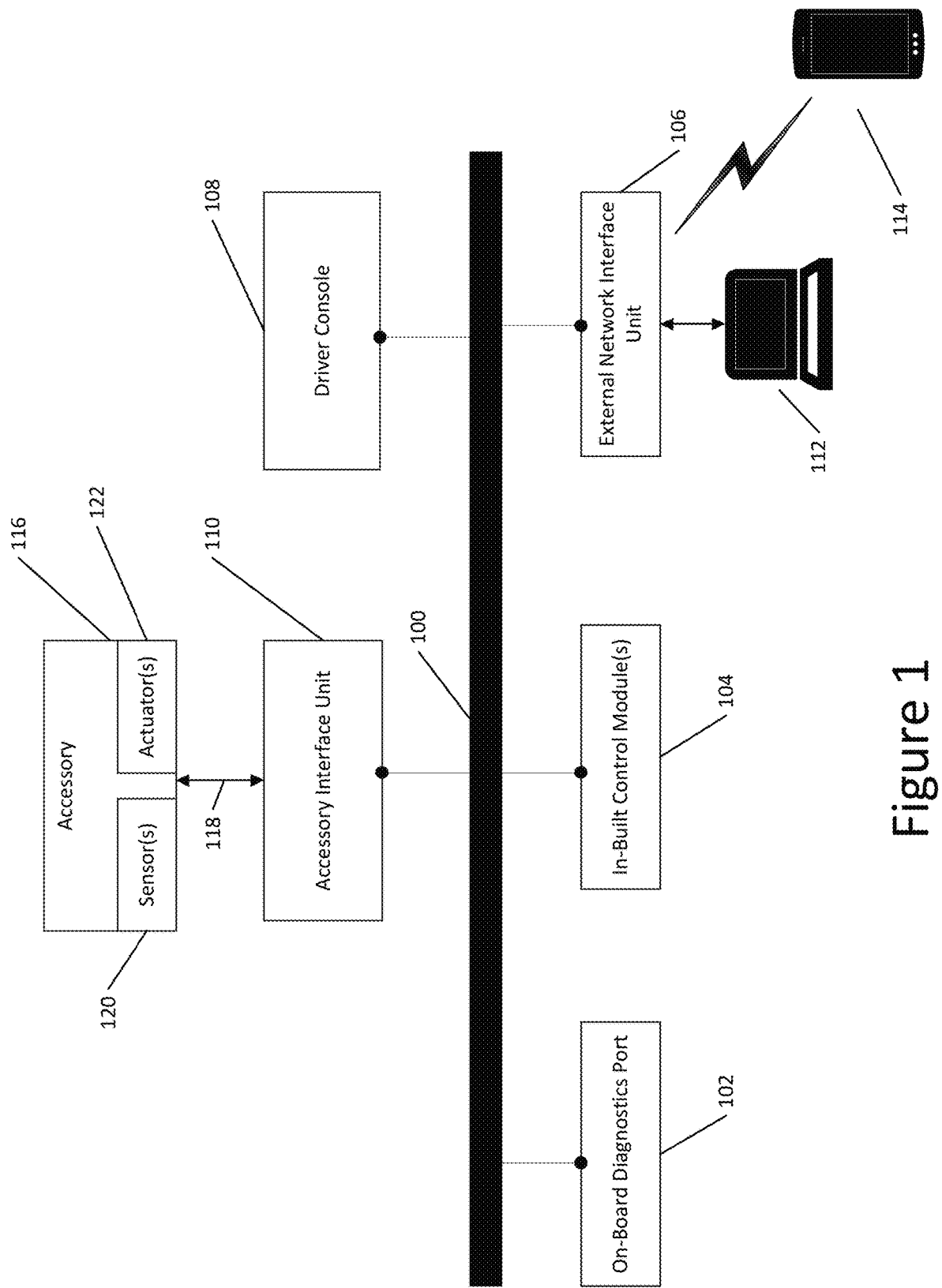
FIG. 1 illustrates a controller area network of a vehicle open to the addition of an active accessory.

FIG. 1 is a schematic illustration of a controller area network 100 installed in a vehicle. The controller area network 100 provides digital communication between a number of vehicle sub-systems. The vehicle sub-systems connected to the controller area network include an On-Board Diagnostics port 102, a plurality of control modules 104 built into the vehicle at time of production, an external network interface 106, a driver console 108, and an accessory interface unit 110. In the present example, the accessory interface module 110 is installed in the vehicle after production, but in other examples, the accessory interface unit 110 may be installed in the vehicle at the time of production.

The driver console provides a display which may indicate environmental parameters, the state of vehicle sub-systems or components, or the state of an accessory, to the driver. The display may also allow driver input, e.g. from a graphical user interface allowing the selection of menu items or the setting of values. Both driver input and display output may be provided by a touchscreen.

In the present example, the external network interface unit 106 provides a socket for receiving a wired link to a personal computer 112 or a smartphone 114 or other mobile communications device. In other examples, the external network interface unit 106 alternatively or additionally provides a wireless network link to a personal computer 112 or a smartphone 114 or other mobile communications device.

The accessory interface unit 110 provides one or more communications ports allowing the wired (or in some examples wireless) connection of respective accessories 116 to the accessory interface unit 110 via a communications link 118. In particular, the communications link 118 may be arranged to carry control signals to one or more actuators 122 which may be included in the accessory, and may be arranged to receive sensor signals from one or more sensors 120 which may be included in the accessory 116.

Figure 2:
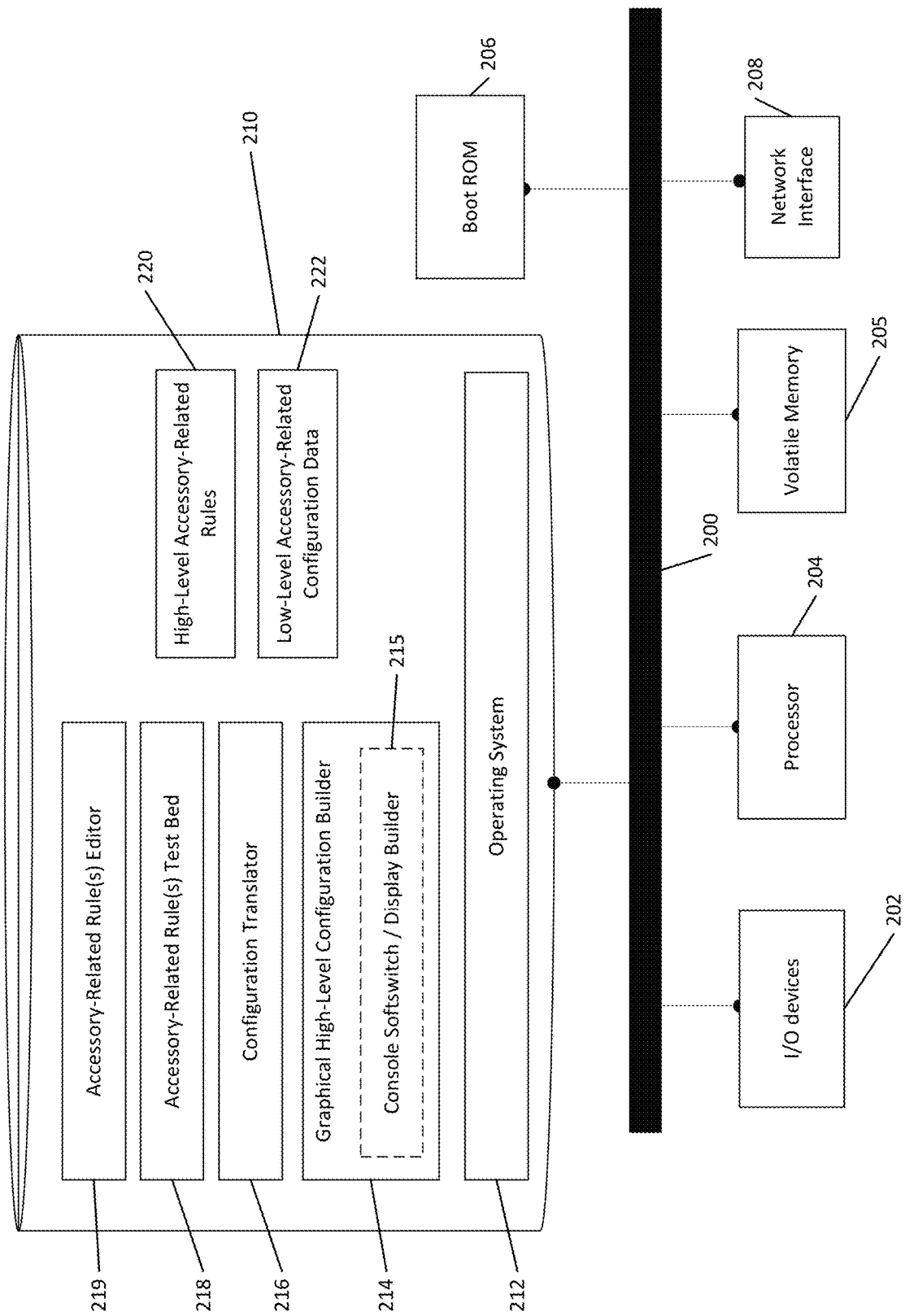
FIG. 2 illustrates a computer system configured to create lower-level accessory-related configuration for use in the controller area network of FIG. 1.

FIG. 2 shows an example software and hardware architecture of personal computer 112 or smartphone 114. The architecture includes one or more digital communication busses 200 which connect input/output devices (such as a computer mouse, trackpad, touchscreen, display screen, keyboard), one or more processors 204, volatile memory 205, a boot ROM 206, one or more network interfaces 208, and a persistent store 210 (for example solid-state storage).

The one or more network interfaces 208 might include a local area network interface, which local area network may form part of an internetwork, for example an intranet or the Internet. Alternatively or additionally, the network interfaces 208 may include a direct connection to a metropolitan or wide area network.

The persistent store 210 stores an operating system program 212, a graphical high-level configuration builder 214, a configuration translator 216, and an accessory-related rule test bed 218. In some examples, the graphical high-level configuration builder 214 includes a console softswitch/display builder 215. The persistent store 210 may further store an accessory-related rules editor 219.

The persistent store 210 further stores high-level accessory-related rules 220 generated or edited by graphical high-level configuration builder 214, and low-level accessory related configuration data 222 generated by the configuration translator 216.

An example of a data structure which might be used in storing and manipulating accessory configuration rules is shown in FIG. 3. The data structure includes a set (referred to in the diagram as a 'project') of one or more high-level accessory related rules (referred to in the diagram as 'logic sequences'). Each high-level accessory related rule may include:

i) a rule identifier;
ii) (optionally) a field indicating the owner or author of the rule;
iii) (optionally) a field indicating a version number of the rule;
iv) an event 310 which triggers the rule;
v) a set 314 of one or more actions to be performed;
vi) (optionally) a set 312 of one or more conditions which must additionally be met in order for the actions to be performed in response to the event.

The identified event 310 may, for example, be generated in response to a sensor associated with the accessory 116 whose behavior is governed by the rule detecting a particular circumstance. In other instances, the parameter might be from device measuring an environmental value (e.g. ambient temperature), from a sensor of a vehicle operational parameter (e.g. exhaust temperature), or from another sub-system in the vehicle—either a sub-system associated with another accessory and sub-system provided in the vehicle at the time of production. In other examples, the event may be the selection by the user of a softswitch or graphical menu item on the driver console 108. This enables the possibility of the driver controlling an accessory from the driver console 108.

Similarly, each of the set 312 of conditions may relate to a parameter provided by a sensor associated with the accessory 116 whose behavior is governed by the rule detecting a particular circumstance. In other instances, the parameter might be from device measuring an environmental value (e.g. ambient temperature), from a sensor of a vehicle operational parameter (e.g. exhaust temperature), or from another sub-system in the vehicle—either a sub-system associated with another accessory and sub-system provided in the vehicle at the time of production.

In this example, one or more of the conditions 314 may have three fields, namely a parameter 316, one or more key values (a single value might provide a threshold value, whereas a pair of values might define a range of values), and a comparison operator 320. The comparison operator 320 can thus provide for the comparison of a sensor value with a threshold, or provide an operator to indicate whether or not a sensor value falls within a given range.

Each of the set 314 of actions 322 may be an action performed by an actuator of the accessory whose behavior is governed by the rule, or may be an action performed by another sub-system of the vehicle. The action 322, may for example, be the presentation of an alert or reading on the driver console 108.

The process for inputting user-specified accessory-related rules (FIG. 4) begins with by generating 400 a rule-building graphical user interface using the computer's input/output devices 202. User input is then received 402 defining a trigger event, optionally one or more conditions (sometimes including a parameter, one or more key values, and a comparison operator), and one or more actions. The events, conditions and actions can be selected by the user using drop down menus, or in other examples by dragging and dropping graphical elements representing available events, conditions and actions onto a panel, and placing connectors between the elements to represent associations between the events, conditions and actions used in the accessory-related rule being entered. The interface also enables the user to group together a set of accessory-related rules into a set or project. In some instances, the connectors represent a logical sequence between the event, condition(s) and action(s) or an order in which two or more actions should be performed.

Once a set of one of more accessory-related rules has been specified by the user using the rule-building graphical user interface, the user can save 404 the accessory-related rules 220 in persistent storage 210. The user is also able to save the accessory-related rules in a shared accessory-related rules library on a shared server accessible to the computer via the network interface 208. The shared server may be shared by the members of the same enterprise as the user (an example of a closed user group), or may be available to the public (in either case the rules may be accessible via a web server).

An accessory-rule(s) test bed process (FIG. 4) begins by generating 500 a software model of a vehicle equipped with one or more accessories. The software model (e.g. a software object) includes a representation of the state of the different sub-systems of and accessories added to a vehicle and possible actions offered by the vehicle and its accessories (the actions being represented, for example, as methods of the software object). The software model may also include the location of each accessory, and possibly the location of one or more sensors or actuators associated with the accessory. The user is able to select a set of one or more rules to be imported 502 into the software model (or a set of rules in the user's current project may be imported into the model). The test bed process then generates for display 504 an initial state of the vehicle equipped with the one or more accessories. The initial state of the vehicle may include default values of environmental variables and default values of operational parameters of vehicle and accessory components and sub-systems. It is to be noted that the operational parameters need not be numerical, but might instead be nominal, ordinal or Boolean values. The display may also include the location of each accessory, possibly the location of one or more sensors or actuators associated with the accessory, and a visual indication of the state of the accessory (e.g. if a beacon light accessory is on it may be colored orange, and the position of the open-box bed accessory of a dump truck might be shown as raised or lowered). In some examples, the initial state of the driver's console is also displayed 505. The computer further generates for display 506 a graphical user interface allowing the user to specify one or more simulated events to happen, and optionally to set one or more conditions (i.e. set a parameter describing the environment in which the vehicle is operating, a parameter setting the state of a vehicle component, sub-system or accessory). The initial state of the software object representing the vehicle is then amended to accord with the entered parameters, and the resultant state of the software model of the vehicle following one or more user-specified events given operation in accordance with the imported set of rules is determined 508. The resultant state of the accessory-equipped vehicle is then displayed 510. In some examples, the resultant state of the driver's console is also displayed 510.

An accessory rule(s) editor process (FIG. 6) begins by retrieving one or more high-level accessory-related rules 600 from persistent storage (this may be the computer's persistent store 210, or may alternatively be a persistent store of a server connectable to the computer via network interface 208). The editor then generates 602 a graphical user interface on the computer's display for editing the high-level accessory-related rules. The editor receives user edits of the retrieved accessory-related rules 604, and then stores the edited accessory-related rules in persistent storage (again, either in persistent storage 210, or in persistent storage of a server).

A high-level rule translation and deployment process (FIG. 7) begins by translating user-specified accessory-related rules 700 to lower-level accessory-related configuration data readable by the accessory interface unit 110. In some examples, the translation uses one or more look-up tables to convert the high-level description of an event, condition or action to a controller area network signal specification corresponding to a signal which indicates the occurrence of the event or which commands a vehicle sub-system or accessory to perform the action. The lower-level accessory-related configuration data 222 may be stored in persistent storage 210. In some examples, the lower-level accessory-related configuration is not stored. Whilst requiring the re-running of the translation 700 each time the lower-level configuration data needs to be generated, this has the advantage that the generated lower-level configuration data can take account of changes to the signals used on the controller area network provided the look-up tables are suitably updated after each change to the signal used on the controller area network.

The generated lower-level accessory-related configuration data is then provided 704 to the accessory interface unit 110. Depending upon the nature of the memory used in the accessory interface unit, this might involve the recording of the configuration data in persistent storage in the access interface unit, or might involve the updating of firmware in the accessory interface unit 110.

In examples where the high-level rules specify input or output graphical elements to be included in the driver console 108, the translation 700 may also generate low-level console configuration data which is provided 706 to the console system 108.

Once the configuration data has been deployed to the accessory interface unit 108, and optionally the driver console 108, the deployment of that configuration data to that particular vehicle may be recorded in persistent storage. The record may include an identifier of the high-level rules, and/or an identifier of the lower-level configuration data, an identifier of the vehicle, and/or an identifier of the accessory interface unit and/or the driver console. The record may further include a timestamp indicating at least the date on which the configuration was loaded onto the accessory interface unit 110, an identifier of the person responsible for the configuration update etc. In some examples where the vehicle is one of a fleet of vehicles under common management, an application programming interface of a fleet management system is called in order to load a record of the vehicle configuration onto the fleet management system.

FIG. 8 is a screenshot of a software application for generating user-specified accessory-related rules and uploading them to a vehicle. On the start page, the user is able to choose which accessory is to be connected to a vehicle in field 800, and able to specify the type of vehicle to which the accessory is to be fitted in field 802. The user is also offered the option of clicking on an 'create your own logic' button 804 to enable the user to create user-specified accessory-related rules.

FIG. 9 is a screenshot of a first version of a tool for specifying and testing high-level configuration rules. A toggle button allows the user to select between Build Mode (as described in relation to FIG. 4 above) and Test Mode (as described in relation to FIG. 5 above). A panel is provided into which a user can add event boxes 902, 904 representing events relating to the state of the vehicle (e.g. the battery temperature reading equaling 86 degrees centigrade), timing blocks 904 (e.g. a delay block set to 100 ms), and action boxes 908. But drawing connectors 910 between event boxes 902, 904 and action boxes 908, the user is able to specify accessory-related event-action rules, or event-condition-action rules and, by including timing blocks 904 is able to generate timing-dependent rules. The values of parameters may be editable by the user selecting the value in the interface and providing a new value. Similarly straightforward amendments are possible to comparison operators (such as the equals operator in event box 902). Furthermore, a box can be switched from being an event box ('when . . . ') to an action box ('then . . . ') by simply changing the box type (e.g. by choosing the option 'then . . . ' rather than 'when . . . ' In electronic terms, the user interface provides a user with the ability to specify a mapping from the occurrence of one or more signals (optionally in a predetermined time relationship) on the controller area network to the generation by the accessory interface unit 110 of one or more output signals on the controller area network. Of course, instead of boxes any other graphical element might be used.

The user interface further comprises graphical elements 912, 914 enabling the selection of a particular vehicle, and the deployment of the configuration entered via the user interface to the selected vehicle.

FIG. 10 is a screenshot of another window drawn by the first version of the tool for specifying and testing high-level configuration rules. The window enables the addition of a graphical user interface element (referred to in the diagram as a 'softswitch' on the driver console which when activated by the user is converted by the Accessory Interface Unit 110 to a control signal on the vehicle's controller area network to switch or toggle the accessory in question between states (e.g., in the case of a light, 'on' or 'off'). The interface (FIG. 10) allows the user to specify which page of the driver console pages and where on that page the 'softswitch' should appear. Once a softswitch is specified, it appears as an optional input to a high-level accessory-related rule as will be described below in relation to FIG. 12.

FIG. 11 is a screenshot of a second version of a tool for specifying and testing high-level configuration rules. The tool provides a graphical element ('Add' button 1106) enabling the user to add accessories, or accessory-related sensors or actuators. In the example shown in FIG. 11, the vehicle is provided with a beacon light accessory (represented by icon 1100), a raisable bed (represented by icon 1102) and a payload sensor (represented by icon 1104). These provide the accessory-related signals to the Accessory Interface Unit 110 (in the Figure, this is referred to as the 'CIM'—Custom Interface Module).

The graphical user interface of the second version of the tool further includes a logic specification section which allows the user to specify 'if-then' rules. The user is able to click on an input factor graphical user interface element 1108 to select an event or condition, and another output action graphical user element 1110 to select an action to be consequent on the event or condition occurring.

FIG. 12 is a screenshot of the second version of the tool after a user has specified a number of accessory-related rules for a vehicle. In the first rule, the input factor is the activation by the driver of a softswitch on the driver's console 108. In this particular example, the softswitch would be represented by a suitable beacon light icon or wording, and the output action is to toggle the beacon lights accessory on or off. In the second rule, the input factor is the value output by a sensor exceeding a threshold, and the output action is to change the display on the driver's console. In this particular example, the sensor is a payload sensor, and the change of display is the display of an alert on the driver's console 108 (in these diagrams, the applicant's trademark 'SYNC' is used to refer to the driver's console). Finally, in a third rule, the input factor is again activation by the driver of a softswitch on the driver's console 108, but in this case one or more conditions must be met before the input factor triggers the resultant action. Furthermore, in this example, a plurality of output actions are the consequence of the occurrence of the event when the specified one or more conditions are met. In this particular example, the conditions relate to vehicle state (e.g. the automatic gearbox being placed in 'Park' and the parking brake being on). The output actions are to turn the hazard lights on and raise or lower the bed.

FIG. 13 shows the test bed display of the second version of the tool. The test bed display includes three panels—an input panel 1300 allowing the user to specify vehicle states and events, a representation 1302 of the display on the driver's console, and vehicle/accessory state panel 1304 illustrating the output state of the vehicle and the accessories that the vehicle is equipped with. The user is able to change the input state of the vehicle and its accessories by the use of:

i) one or more toggle buttons 1306 allowing the selection of one of two states;
  ii) one or more radio buttons 1308 allowing the selection of one of a plurality of states;
  iii) one or more numerical value fields 1310 allowing the input of a value of a vehicle/accessory parameter.

Those skilled in the art will realise that other graphical user interface elements, such as sliders, scroll wheels and the like might be used to specify values in other examples. Additionally, one or more labelled event buttons 1312 are provided to allow a user to simulate the occurrence of an event—the label on the button indicating the event to which it relates.

The vehicle/accessory state panel 1304 then illustrates the state of the vehicle which results when the accessory-related rules are applied to the input factors and events selected by the user in the input panel 1300.

Instead of simulation, the computer can be connected to a vehicle so that the accessory-related rules can be tested on an actual vehicle rather than merely being simulated before loading the lower-level configuration data 222 onto the accessory interface unit 110.

FIG. 14 shows the display generated by the tool when the lower-level configuration resulting from the translation of the high-level accessory-related rules is transmitted over a wireless link from the computer or smartphone to the accessory interface unit in the vehicle.

FIG. 15 shows a display provided by the tool when the user accesses a library of high-level accessory-related rules stored on a remote server.

FIG. 16 shows an interface which might be displayed by a fleet management tool fed with data from the accessory configuration tool.

In summary of the above disclosure, the disclosure relates to simplifying the integration of a peripheral with a vehicle. The complexity of modern vehicle electronics means that integration of a peripheral with a vehicle requires a reconfiguration of the vehicle electronics in order for the resultant upfitted vehicle to function as desired by the user. This restricts the set of users and enterprises which are able to successfully integrate a new peripheral with a vehicle. To make the task more approachable, a software application is described which presents a user with a graphical user interface enabling them to specify, at a high-level, rules of behavior for the upfitted vehicle. From the user's inputs via the graphical user interface, the application creates configuration data to be applied to the vehicle electronics in order to produce the desired behavior in the upfitted vehicle.

It will be understood that the invention is not limited to the examples described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of configuring a vehicle to integrate an accessory comprising:
  generating, for display on a touchscreen, an initial state of an accessory-equipped vehicle, wherein the initial state includes default values of environmental variables and default values of operational parameters of vehicle and accessory components and sub-systems;
  generating a graphical user interface, on the touchscreen, allowing a user to specify a test configuration comprising:
    a user-specified high-level accessory-related rule relating to the operation of the accessory-equipped vehicle;
    a simulated event; and
    an environmental variable describing an environment in which the accessory-equipped vehicle is operating, and an operational parameter setting a state of the vehicle and accessory components and sub-systems;

simulating a resultant state of the accessory-equipped vehicle when operating under the control of the test configuration;

displaying, on the touchscreen, the resultant state of the accessory-equipped vehicle before loading the test configuration into the accessory-equipped vehicle;

receiving the user-specified high-level accessory-related rule at the accessory-equipped vehicle;

translating the received user-specified high-level accessory-related rule into a lower-level accessory-related configuration readable by an accessory interface unit having one or more communication ports adapted for communication with sensors or actuators associated with the accessory; and providing the lower-level accessory-related configuration to the accessory interface unit;

whereby the accessory interface unit cooperates with the sensors or actuators associated with the accessory to operate the accessory in accordance with the received user-specified high-level accessory-related rule.

2. The method of claim 1, further comprising translating the received user-specified high-level accessory-related rule to a low-level driver console configuration file for specifying an appearance of one or more GUI elements on the console providing an operator of the vehicle with one or both of control of the accessory and visibility of a status of the accessory.

3. The method of claim 1, further comprising storing the user-specified high-level accessory-related rule in persistent storage accessible to users tasked with configuring other vehicles with the accessory.

4. The method of claim 3, further comprising:
retrieving the user-specified high-level accessory-related rule from the persistent storage;
generating a graphical user interface for editing the retrieved user-specified high-level accessory-related rule;
receiving user edits of the retrieved user-specified high-level accessory-related rule;
storing the edited user-specified high-level accessory-related rule in the persistent storage accessible to users tasked with configuring other vehicles with the accessory.

5. The method of claim 1, further comprising generating, for display, a graphical user interface enabling modification of a stored high-level accessory-related rule.

6. The method of claim 1, wherein providing the lower-level accessory-related configuration to the accessory interface unit comprises transmitting the lower-level accessory-related configuration to the accessory interface unit over an external communication link to the vehicle.

7. The method of claim 1, wherein the user-specified high-level accessory-related rule comprises an event-action rule or a condition-action rule.

8. The method of claim 7, wherein the user-specified high-level accessory-related rule comprises the condition-action rule in which a condition includes a parameter from a sensor associated with the accessory.

9. The method of claim 7, wherein an action comprises operating an actuator to change the state of the accessory.

10. The method of claim 1, wherein simulating the resultant state of the accessory-equipped vehicle comprises generating a software model of the accessory-equipped vehicle operating in accordance with the user-specified high-level accessory-related rule entered by the user.

11. A system for configuring a vehicle to integrate an accessory, wherein the system comprises control circuitry configured to:
generate, for display on a touchscreen, an initial state of an accessory-equipped vehicle, wherein the initial state includes default values of environmental variables and default values of operational parameters of vehicle and accessory components and sub-systems;
generate a graphical user interface, on the touchscreen, allowing a user to specify a test configuration comprising:
a user-specified high-level accessory-related rule relating to the operation of the accessory-equipped vehicle;
a simulated event; and
an environmental variable describing an environment in which the accessory-equipped vehicle is operating, and an operational parameter setting a state of the vehicle and accessory components and sub-systems;
simulate a resultant state of the accessory-equipped vehicle when operating under the control of the test configuration;
display, on the touchscreen, the resultant state of the accessory-equipped vehicle before loading the test configuration into the accessory-equipped vehicle;
receive the user-specified high-level accessory-related rule at the accessory-equipped vehicle;
translate the received user-specified high-level accessory-related rule into a lower-level accessory-related configuration readable by an accessory interface unit having one or more communication ports adapted for communication with sensors or actuators associated with the accessory; and
provide the lower-level accessory-related configuration to the accessory interface unit;
whereby the accessory interface unit cooperates with the sensors or actuators associated with the accessory to operate the accessory in accordance with the received user-specified high-level accessory-related rule.

12. The system according to claim 11 in which:
the system comprises an embedded system, the embedded system further comprising:
a controller area network port connectable to a vehicle controller area network;
one or more accessory ports connectable to electrical systems of respective accessories;
a processor;
the control circuitry being further configured to:
store the lower-level accessory-related configuration;
interpret the lower-level accessory-related configuration to generate a control signal on one of the one or more accessory ports in response to a sensor signal received on the one of the one or more accessory ports, or to cause the generation of a control signal on the one of the one or more accessory ports in response to a sensor signal received on one of the other ports of the one or more accessory ports.

13. The system according to claim 12 in which the received sensor signal is indicative of a driver input on an accessory control element displayed on a driver console.

14. The system according to claim 12 in which an output control signal controls the output of an accessory state display element on a driver console.

15. A computer-readable medium for configuring a vehicle to integrate an accessory, wherein the computer-readable medium tangibly embodies instructions executable by a processor to:
- generate, for display on a touchscreen, an initial state of an accessory-equipped vehicle, wherein the initial state includes default values of environmental variables and default values of operational parameters of vehicle and accessory components and sub-systems;
- generate a graphical user interface, on the touchscreen, allowing a user to specify a test configuration comprising:
  - a user-specified high-level accessory-related rule relating to the operation of the accessory-equipped vehicle;
  - a simulated event; and
  - an environmental variable describing an environment in which the accessory-equipped vehicle is operating, and an operational parameter setting a state of the vehicle and accessory components and sub-systems;
- simulate a resultant state of the accessory-equipped vehicle when operating under the control of the test configuration;
- display, on the touchscreen, the resultant state of the accessory-equipped vehicle before loading the test configuration into the accessory-equipped vehicle;
- receive the user-specified high-level accessory-related rule at the accessory-equipped vehicle;
- translate the received user-specified high-level accessory-related rule into a lower-level accessory-related configuration readable by an accessory interface unit having one or more communication ports adapted for communication with sensors or actuators associated with the accessory; and
- provide the lower-level accessory-related configuration to the accessory interface unit;
- whereby the accessory interface unit cooperates with the sensors or actuators associated with the accessory to operate the accessory in accordance with the received user-specified high-level accessory-related rule.

16. A vehicle comprising a system according to claim 11.

* * * * *